United States Patent Office 2,930,189
Patented Mar. 29, 1960

2,930,189

GAS TURBINE ENGINE WITH SHAFT-FAILURE CONTROL

James Alexander Petrie, Littleover, England, assignor to Rolls-Royce Limited, Derby, England, a British company Application April 3, 1958, Serial No. 726,260

Claims priority, application Great Britain April 8, 1957

11 Claims. (Cl. 60—39.09)

This invention comprises improvements in or relating to gas-turbine engines of the kind which comprises a turbine rotor and a coaxial driven member, for example a compressor rotor, or a reduction gear of a propeller, or both, the turbine and driven member being interconnected by a driving shaft. Such a gas-turbine will be termed "a gas-turbine of the kind referred to." The invention is more particularly, though not exclusively, applicable to single shaft and "two-shaft" propeller-driving gas-turbine engines. A "two-shaft" engine has a low-pressure compressor and a high-pressure compressor in series flow supplying air to combustion equipment, the combustion products from which are passed to a high-pressure turbine and a low-pressure turbine in series flow, the low-pressure turbine driving the low-pressure compressor through a first shaft and the high pressure turbine driving the high-pressure compressor through a second shaft; in such an engine the propeller is usually driven by the low-pressure turbine.

It will be appreciated that, in the event of failure of the shaft driving the propeller or, in the case of a two-shaft engine, the shaft driving one of the compressors and propeller, the turbine will accelerate rapidly due to the removal of the load it is driving and that, unless such acceleration is prevented, over-speeding and serious damage such as bursting of the turbine rotor, may occur.

This invention has for an object to provide control means which responds rapidly to shaft failure to prevent such over-speeding.

According to the present invention, in a gas-turbine of the kind referred to, there is provided a pair of mechanically-connected parts respectively mechanically connected to the rotor assembly at opposite ends of the ends of the driving shaft, the mechanical connection between the parts and the mechanical connections between the parts and the rotor assembly being such that, on failure of the shaft and consequent relative rotation of the turbine and driven member, one of the parts is moved relative to the adjacent end of the shaft, and the said one part is connected to cause by said movement a reduction in the fuel supply to the engine.

Preferably, the fuel supply to the engine is cut-off by such movement.

According to a preferred feature of this invention, one of the mechanical connections by which said one part is connected in the rotor assembly is a torque-transmitting connection permitting axial displacement of the one part relative to the rotor assembly and the other of the mechanical connections is a threaded connection whereby, on said relative rotation of the turbine and driven member, the said one part is displaced axially of the rotor assembly.

According to one preferred arrangement of this invention, the pair of parts are a rod or the like secured to the turbine to rotate therewith and extending coaxially through the shaft, and a sleeve in driving engagement with the driven member, such as the engine compressor, so as to rotate therewith and to be displaceable axially thereof, and the interconnection between the pair of parts is a screw-threaded or the like interconnection so that, on relative rotation of the turbine and driven member, the parts rotate relatively and the sleeve is moved axially of the driven member, and the sleeve is connected to cause by such axial movement a reduction of fuel supply to the engine.

According to another preferred arrangement, the pair of parts comprise a rod which is secured to the rotor assembly at one end thereof and extending coaxially through the assembly, and a sleeve having a splined engagement with the opposite end of the rod and having a threaded engagement with the adjacent end of the rotor assembly whereby on relative rotation of the turbine and driven member, the sleeve is displaced axially. The sleeve on such axial displacement abuts and displaces a plunger member which has a cable connection with a fuel control valve, and the plunger and valve are spring-loaded to maintain tension in the cable.

Preferably the shaft is drivingly interconnected with the driven member by means which permit relative axial movement and in this case, on failure of bearing means supporting the turbine and consequent rearward movement of the shaft relative to the driven member, the sleeve will be moved axially by the rod or the like to cause a reduction in fuel supply, although failure of the driving shaft may not have occurred.

Two constructions of gas-turbine engine incorporating the invention will now be described by way of example with reference to the accompanying drawings in which:

Figure 4 illustrates the application of the control arrangement of Figures 2 and 3 to a two-shaft engine.

Figure 1:
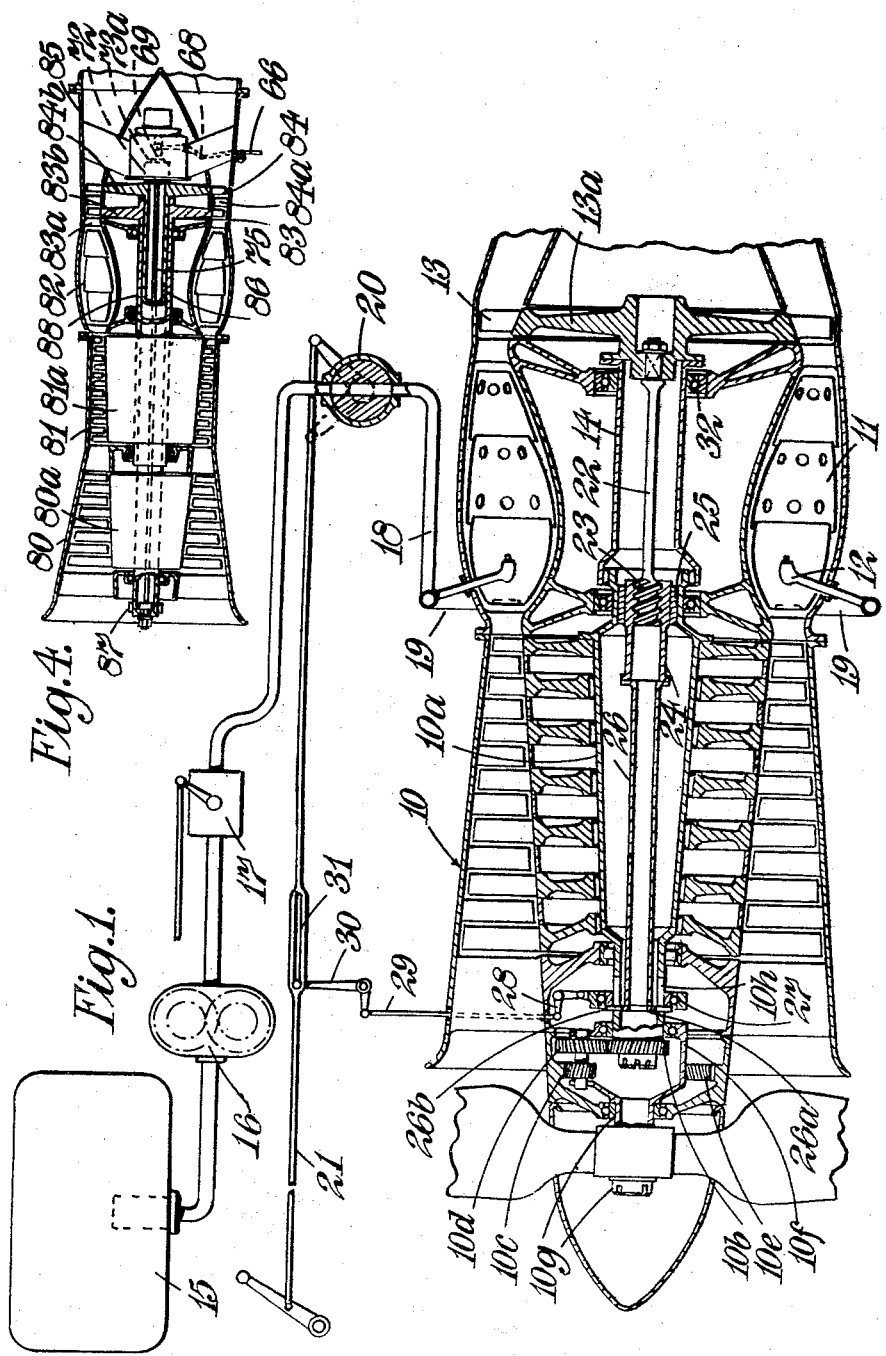
Figure 1 illustrates the first construction.

The engine (Figure 1) is of the propeller-driving kind and comprises a compressor 10 having a rotor structure 10a, combustion equipment 11 receiving compressed air from the compressor 10 and fuel to be burnt with the air through injectors 12, a turbine 13 having a rotor 13a and receiving the combustion gases from the combustion equipment 11 to be driven thereby, and a hollow shaft 14 drivingly interconnecting the rotors 10a, 13a.

The propeller is driven from the forward end of the compressor rotor 10a through planetary reduction gearing comprising a sunwheel 10b mounted on the forward end of the compressor rotor 10a, planet gears 10c and 10d, of which gears 10c mesh with a stationary annulus gear 10e, the planet gears being mounted for rotation in a planet carrier 10f, the forward end 10g of which constitutes the propeller shaft.

Fuel is supplied to the injectors 12 from a fuel tank 15 through a fuel system comprising a fuel pump 16, a throttle control 17 and delivery pipe 18 leading to a manifold 19 supplying the injectors. The delivery pipe 18 has connected in it a shut-off cock 20 which is operated under control of a rod 21 which is capable of actuation by the pilot.

The shut-off cock 20 is also arranged to be closed in the event of failure of either the shaft 14 or the compressor rotor 10a during operation of the engine.

In this construction, the mechanism for so actuating the shut-off cock 20 comprises a rod 22 secured at one end to the turbine rotor 13a so as to rotate therewith and extending coaxially through the shaft 14. The rod 22 has at its opposite end a threaded head 23 engaging an internal thread in a sleeve 24 which is supported in a bush 25 so that the sleeve 24 is capable of movement relative to the rotor 10a in the axial direction. The forward end of the sleeve 24 has rigidly secured to it one end of a tube 26 which extends coaxially through the rotor 10a to adjacent its forward end and has its opposite end secured to the centre of a cross-member 26a having radial fingers 26b which extend through axial slots 10h in the rotor shaft. The outer ends of the radially extending fingers 26b are secured to the inner race of a thrust-bearing 27 which thus rotates with the rotor 10a but is free to slide axially of it. Thus the sleeve 24 is driven by means of the slots 10h, fingers 26b and tube 26 at the same rotational speed as the rotor 10a and is capable of axial movement relative to the rotor 10a. The outer race of the bearing 27 has pivoted to it one arm of a bell-crank 28. The other arm of the bell-crank 28 is linked by a rod 29 to one arm of a further bell-crank 30, the other arm of which has a pin and slot connection 31 with the operating rod 21 of the shut-off cock 20.

Normally, the mechanism 22—31 is inoperative and does not affect the operation of the shut-off cock 20. If, however, the compressor rotor 10a or the shaft 14 fractures in operation of the engine, the turbine rotor 13a tends to over-speed due to the loss of its load and the rod 22 rotates relative to the sleeve 24 so displacing the sleeve axially relative to the compressor rotor 10a. This axial displacement of sleeve 24 is arranged by suitable selection of the hand of the threaded interconnection between the rod 22 and sleeve 24 to cause rocking of the bell-crank 30 in the sense to close the shut-off cock; in the illustrated arrangement the sleeve 24 is caused to be moved to the right as seen in the drawing. Closure of the shut-off cock 20 causes rapid cut-off of the fuel supply to the engine and thus serious damage due to over-speeding of the turbine rotor 13a is prevented. It will be seen that due to the positive mechanical operation of the shut-off cock 20, a very rapid operation is obtained as soon as the turbine rotor 13a over-runs the compressor rotor 10a.

With the illustrated arrangement if failure of the rear bearing 32 supporting the turbine occurs the turbine and shaft 14 will move rearwards, this movement being permitted by the splined connection between the shaft 14 and compressor rotor 10a, and the sleeve 24 will be pulled rearwards by the rod 22 to operate the shut-off cock 20. This will be permitted even though the shaft 14 may not have failed and will prevent over-speeding of the turbine in the event of the splines becoming disengaged.

Figure 2:
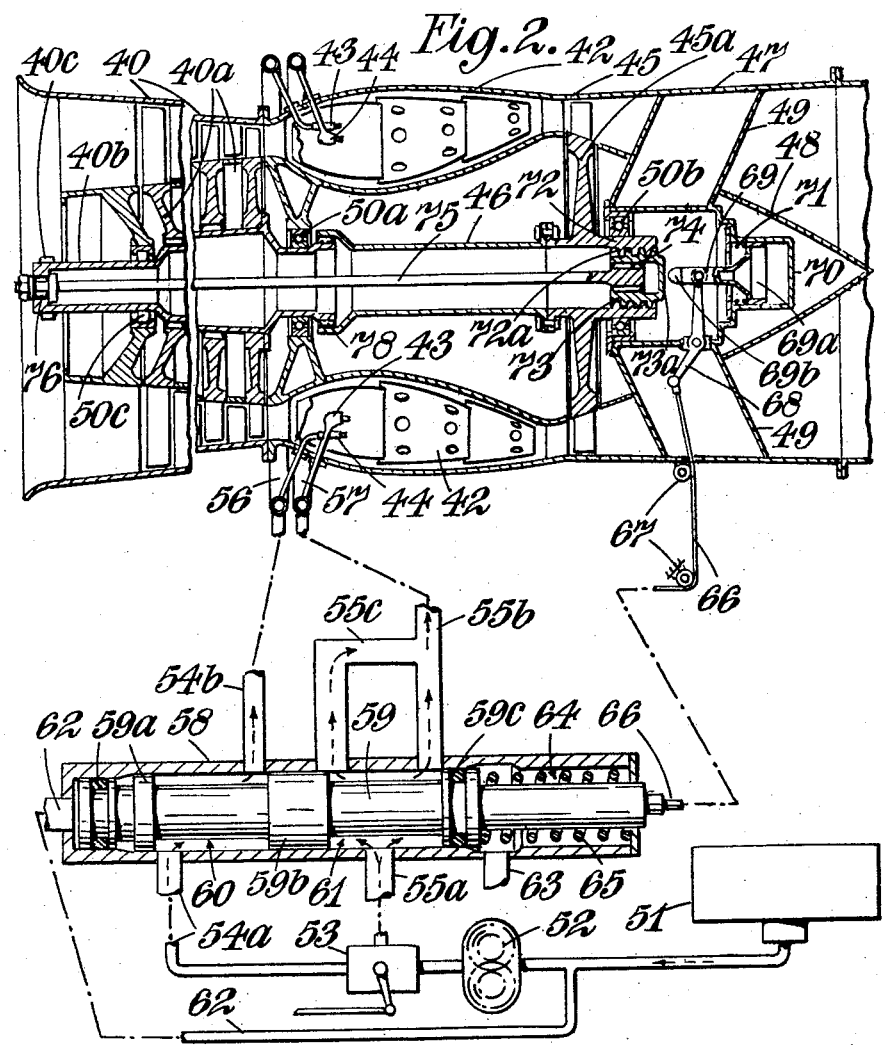
Figure 2 illustrates the second construction.
Figure 3:
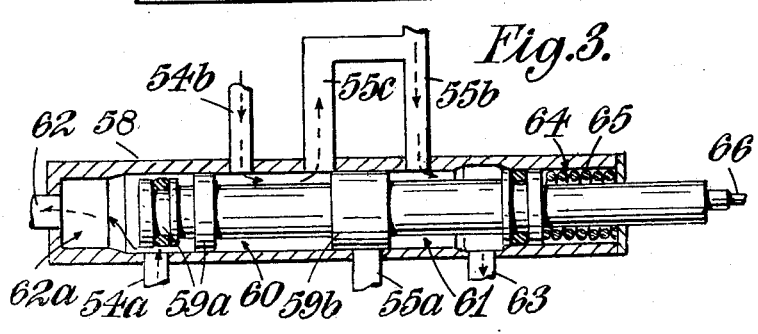
Figure 3 shows part of Figure 2 in a second position of adjustment.

Referring now to Figures 2 and 3, the engine shown comprises a compressor 40 having a rotor structure 40a the forward end of which has a stub shaft 40b carrying a sun gear 40c of a planetary reduction gear through which a propeller is driven, combustion equipment 42 receiving compressed air from the compressor 40 and fuel from pilot injectors 43 and main injectors 44, a turbine 45 having a rotor 45a driving the rotor 40a through hollow shaft 46, and an exhaust assembly including outer wall 47, central cone 48 and hollow struts 49 supporting the cone 48 from the wall 47. The rotor assembly 40a, 45a, 46 is supported in bearings 50a, 50b, 50c.

Fuel is supplied to injectors 43, 44 from fuel tank 51, the fuel being drawn from the tank 51 by pump 52 and being delivered by the pump through a fuel control mechanism 53 having a pair of outlet pipes leading respectively to a pilot fuel manifold 56 and main fuel manifold 57 from which the injectors 43, 44 are fed. The outlet pipes are shown as having portions 54a, 54b and 55a, 55b.

The outlet pipes pass through a valve 58 which is operated on failure of shaft 46 to cut off the supply of fuel to the injectors 43, 44.

The valve 58 comprises a hollow valve body containing a piston valve member 59 having lands 59a, 59b, 59c. In normal operation the valve member 59 is in the position of Figure 2 the upstream portion 54a and downstream portions 54b of the one outlet pipe open into the space 60 between lands 59a, 59b, and the upstream portion 55a and downstream portions 55b of the other outlet pipe open into the space 61 between lands 59b, 59c as does also a branch 55c from the downstream portion of the pipe 55. The valve body also has connected to it a return pipe 62 leading from its left hand end to the inlet side of pump 52 and a drain pipe 63 which in the position of Figure 2 opens to space 64 on the right of land 59c. The space 64 contains a spring 65 urging the valve member 59 to the left.

The valve member 59 is connected by a cable 66 running over pulleys 67 to one arm of a bell-crank 68 housed in the cone 48 and the other arm of the bell-crank 68 is connected to a plunger 69. The plunger 69 has an enlargement 69a at one end projecting into a housing 70 containing a compression spring 71 which urges the plunger 69 to the right, and a nose 69b projecting towards the end of shaft 46. The spring 71 serves to keep the cable 66 taut and also to prevent inadvertent contact of the plunger 69 with rotating parts of the engine.

The turbine rotor 45a has a stub shaft 72 projecting through bearing 50b into the cone 48 and the stub shaft has an internal screwthread 72a engaged by an externally-threaded sleeve 73. The sleeve 73 has a splined connection 74 with one end of a rod 75, the opposite end of which has a splined connection 76 with and is secured to a flange 40d internally of the stub shaft 40b adjacent the sun gear 40c. The sleeve 73 has a projection 73a axially-aligned with but slightly spaced from the nose 69b of the plunger 69.

In the event that the shaft 46 breaks in operation, the sleeve 73, due to its connection to rotor 40a through splines 74, rod 75, splines 76 and stub shaft 40b, continues to rotate at the speed of the rotor 40a and the stub shaft 72, due to being connected to the turbine rotor 45a which speeds up, rotates relatively to the sleeve 73 so displacing it rapidly in the axial direction. The hand of the thread 72a is chosen so that on such relative rotation the sleeve 73 is moved to the right bringing projection 73a into contact with nose 69b of plunger 69 and moving the plunger 69 to the right. This movement of the plunger 69 rocks bellcrank 68 and through the cable 66 draws the valve member 59 to the right against spring 65 into the position of Figure 3.

In this position of the valve member 59, the upstream portion 54a of the pilot fuel pipe is connected through space 62a to the return pipe 62 so that fuel is circulated by the pump 52 through pipe 54a, space 62a and pipe 62; also valve space 60 is in communication with pipe portion 54b and branch 55c and valve space 61 communicates with pipe portion 55b and drain pipe 63, the end of pipe portion 55a being closed by land 59b, so that fuel drains away from pipe portions 54b and 55b through drain pipe 63. Thus the fuel supply to the engine is rapidly cut off whereby serious damage to the engine due to over-speeding of the turbine is avoided.

A similar shut off of fuel is obtained if bearing 50b should fail. In this case the gas loads on the turbine rotor 45a move it to the right causing operation of the valve 58, 59. The right hand movement of the rotor 45a is permitted by the spline connection 78 between shaft 46 and the compressor rotor 40a.

Figure 4 illustrates a two-shaft engine which comprises a low-pressure compressor 80 having a rotor 80a, a high-pressure compressor 81 having a rotor 81a, combustion equipment 82, a high-pressure turbine 83 having nozzle guide vanes 83a and a rotor 83b, a low pressure turbine 84 having inlet guide vanes 84a and a rotor 84b and an exhaust assembly 85 connected in flow series.

The low-pressure turbine rotor 84b is connected by a hollow shaft 86 to the low-pressure compressor rotor 80a and the shaft 86 is extended forwards from the rotor 80a to carry a sun gear 87 for driving the reduction gear of a propeller.

The high-pressure turbine rotor 83b is connected by a hollow shaft 88 to drive the high-pressure compressor rotor 81a, the shaft 88 coaxially surrounding the shaft 86.

In order to prevent over-speeding of the turbine rotor 84b in the event of failure of the shaft 86, there is provided a fuel control arrangement such as is shown in Figures 2 and 3, this control arrangement being indicated diagrammatically in Figure 4 and parts of it are indicated by the same references as are employed in Figures 2 and 3.

It is considered unnecessary to provide a similar fuel control arrangement for the high-pressure turbine 83 for a variety of reasons. Firstly if shaft 88 fails in operation, the turbine rotor 83b will move rearwards under the action of the gas loads on it into contact with the stationary guide vanes 84a and the rubbing action will apply a powerful braking action on the turbine rotor which would thus be rapidly slowed down. Secondly, due to failure of the shaft 88 the high-pressure compressor rotor 81a would not be driven and there will be a consequent reduction in the pressure ratio across the turbine assembly to a value much lower than that to which the ratio is reduced by failure of the shaft 86, so that the gas torque tending to drive the turbines will be very low. Thirdly, failure of shaft 88 results in a reduction of torque applied by the low-pressure turbine rotor 84b to the propeller which would therefore slow down, and as a result of the action of the usual propeller pitch change mechanism the pitch of the propeller blades will be coarsened further slowing down the engine. Fourthly in two-shaft engines, it is usual to drive the engine fuel pumps from the high-pressure rotor assembly adjacent the compressor, so that in the event of failure of the shaft 88, the fuel supply to the engine will usually be reduced.

I claim:

1. A gas turbine engine comprising a rotor assembly including as parts thereof a turbine rotor, a rotatively-driven member co-axial with the turbine rotor, and a hollow driving shaft extending between and drivingly interconnecting the turbine rotor and the driven member; combustion equipment wherein fuel is burnt to generate combustion gases, said combustion equipment being connected to deliver the combustion gases to the turbine to actuate it; a fuel system connected to deliver fuel to the combustion equipment and including a fuel valve; and control means adapted to operate on failure of the shaft to cut down the fuel supply by the fuel system, said control means comprising an axially-extending member extending coaxially within the shaft and having ends adjacent the turbine rotor and the driven member respectively, a rigid driving connection between one end of the axially-extending member and the adjacent part of the rotor assembly, an axially-displaceable member mechanically interconnecting the pair of elements constituted by the other end of the axially-extending member and the part of the rotor assembly adjacent said other end and having an axially free driving connection with one of the pair of elements so as to rotate therewith and a helical connection with the other of the pair of elements, said rigid driving connection, the axially free driving connection and the helical connection forming the sole connections between the axially-extending member and the rotor assembly whereby on failure of the shaft the axially displaceable member is displaced axially of the shaft, said axially-displaceable member also being connected to actuate said fuel valve to reduce the fuel delivery on such axial displacement.

2. A gas turbine according to claim 1, wherein the axially-extending member is a rod secured at said one end to the turbine rotor to rotate therewith, said axially-displaceable member is a sleeve having driving engagement with the driven member so as to rotate therewith and to be displaceable axially thereof and having screw-threaded inter-connection with the said other end of the rod whereby on relative rotation of the turbine and driven member, the rod and sleeve rotate relatively and the sleeve is moved axially of the driven member, and the sleeve is connected to actuate the valve.

3. A gas turbine according to claim 2, wherein the sleeve is connected to actuate the valve through means including a thrust bearing having a rotating race secured to the sleeve, whereby the sleeve and bearing move together, and a non-rotating race, and a mechanical linkage for connecting the non-rotating race and the fuel valve to close it on axial displacement of the sleeve.

4. A gas turbine according to claim 3, comprising a tube rigidly secured to the sleeve coaxially with the rotor assembly, a cross-member carried by the tube and secured to the rotating race of the thrust bearing.

5. A gas turbine according to claim 1, wherein the axially extending member is a rod which is secured to the rotor assembly at said one end and said axially displaceable member is a sleeve having an axially splined engagement with the other end of the rod and a threaded engagement with the adjacent part of the rotor assembly.

6. A gas turbine according to claim 5, comprising fixed structure, a plunger mounted in the fixed structure adjacent said sleeve, the sleeve on such axial displacement abutting and displacing the plunger member, and a cable connecting said plunger and the fuel valve to close it on displacement of the plunger.

7. A gas turbine according to claim 6, comprising spring means loading the plunger and the valve and maintaining tension in the cable.

8. A gas turbine according to claim 6, comprising a bell-crank connected to be rocked by the plunger on displacement thereof, the bell-crank having an end of the cable attached to it, the other end of the cable being attached to the valve.

9. A gas turbine according to claim 6, said fuel system comprising both a pilot fuel supply and a main fuel supply each controlled by the fuel valve which has a first and normal setting in which the fuel supplies flow through separate paths in the valve to combustion equipment of the engine and a second setting to which the valve is moved by displacement of the sleeve and in which the fuel supplies are cut off from the combustion equipment and the parts of the fuel supply systems downstream of the valve are connected to drain.

10. A gas turbine according to claim 9, said fuel system including a fuel pump, the valve being also arranged so that in said second setting the parts of one fuel system upstream of the valve are connected to a return fuel pipe leading to a low-pressure side of a fuel pump feeding the system.

11. A gas turbine according to claim 1, comprising bearing means supporting the turbine rotor, said hollow shaft being drivingly interconnected with the driven member by means which permit relative axial movement of the shaft and driven member which on failure of the bearing means and consequent rearward movement of the shaft relative to the driven member, the sleeve will be moved axially to cause a reduction in fuel supply.

References Cited in the file of this patent

UNITED STATES PATENTS

| 2,435,343 | Downey | Feb. 3, 1948 |
| 2,555,568 | Boe | June 5, 1951 |
| 2,596,928 | Ide | May 13, 1952 |

FOREIGN PATENTS

| 617,729 | Great Britain | Feb. 10, 1949 |